No. 743,489. PATENTED NOV. 10, 1903.
D. J. GREEN.
SHOCK LOADER.
APPLICATION FILED MAY 25, 1903.
NO MODEL. 3 SHEETS—SHEET 3.
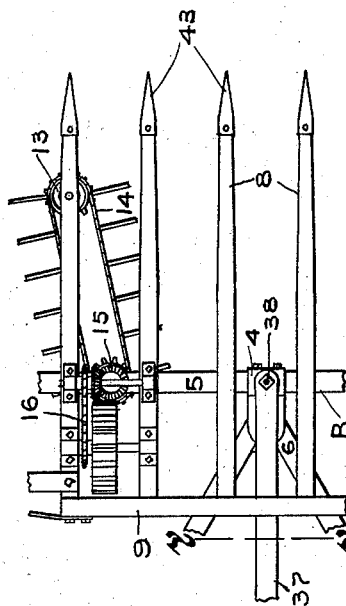
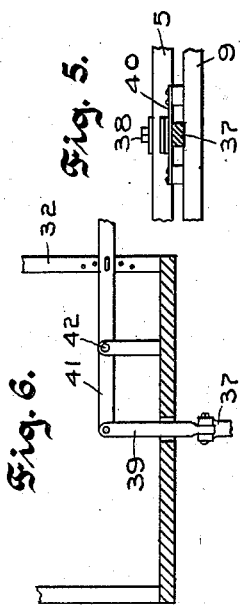
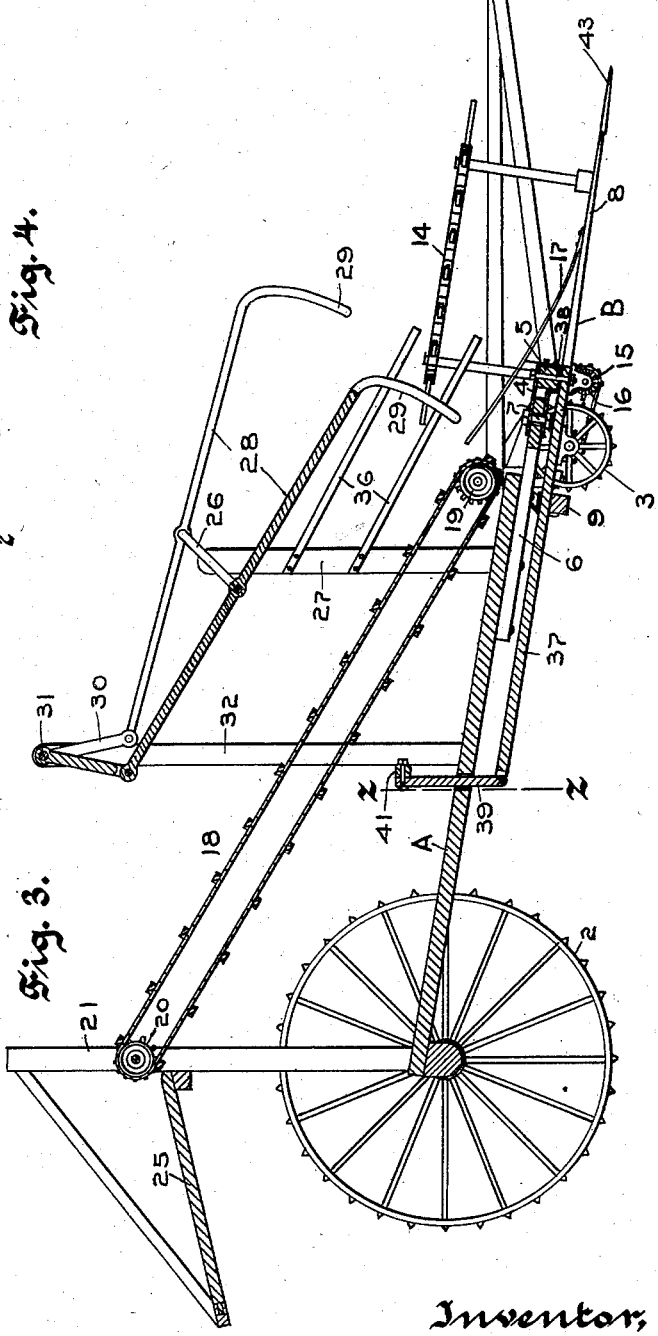
Witnesses,
W. H. Palmer.
Emily F. Otis
Inventor,
David J. Green.
by Lothrop & Johnson
his Attorneys.

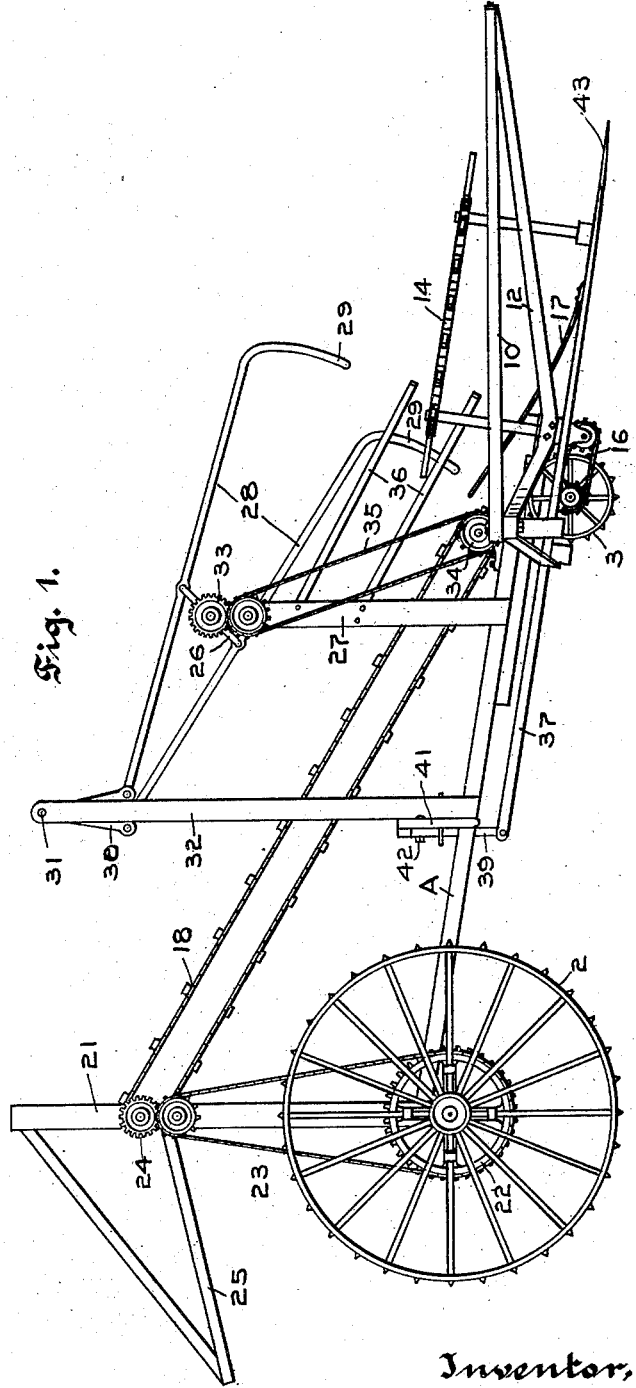

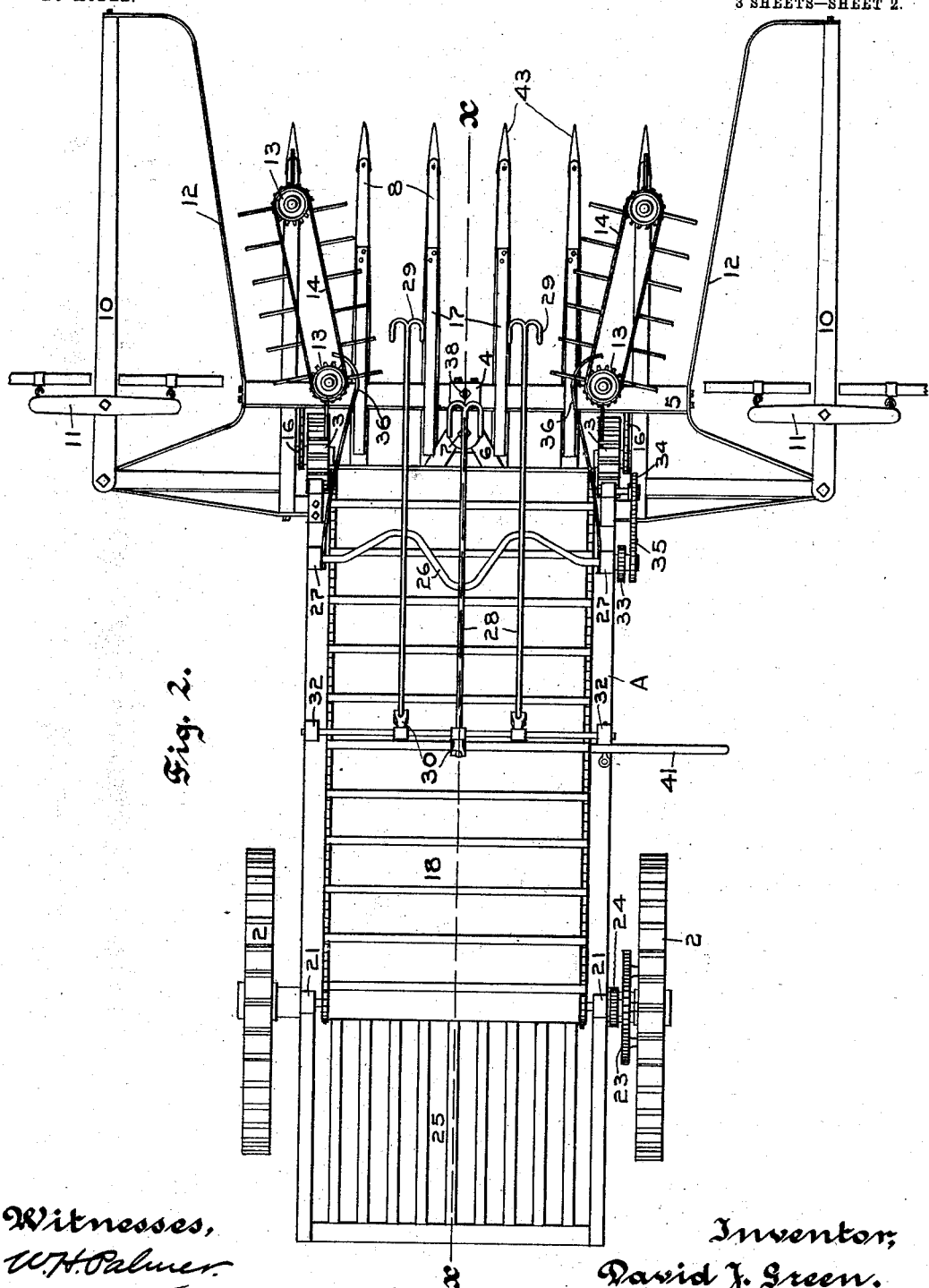

No. 743,489. Patented November 10, 1903.

UNITED STATES PATENT OFFICE.

DAVID J. GREEN, OF WILMONT, MINNESOTA.

SHOCK-LOADER.

SPECIFICATION forming part of Letters Patent No. 743,489, dated November 10, 1903.

Application filed May 25, 1903. Serial No. 158,561. (No model.)

*To all whom it may concern:*

Be it known that I, DAVID J. GREEN, a citizen of the United States, residing at Wilmont, in the county of Nobles and State of Minnesota, have invented certain new and useful Improvements in Shock-Loaders, of which the following is a specification.

My invention relates to improvements in shock-loaders designed for gathering shocks from the ground and carrying them to a suitable receptacle at the rear.

To this end my invention consists in the features of construction and combination hereinafter particularly described and claimed.

In the accompanying drawings, forming part of this specification, Figure 1 is a side elevation of my improved shock-loader. Fig. 2 is a top view of the same. Fig. 3 is a section on line $xx$ of Fig. 2. Fig. 4 is a bottom view of a portion of the gathering-fork. Fig. 5 is a section on line $yy$ of Fig. 4, and Fig. 6 is a section on line $zz$ of Fig. 3.

In the drawings, A represents the frame of the machine, supported at its rear end upon wheels 2. Pivotally supporting the front end of the frame A is the gatherer truck or frame B, mounted upon wheels 3. The truck B is connected with the main frame by a strap 4, secured to the cross-bar 5 of the truck, the forwardly-extending portion 6 of the frame A being secured within the strap 4 by a pivot 7. The truck is provided with a forwardly-projecting fork 8 for gathering the shocks to be loaded, each tine of the fork having a metal tip 43. Said truck is provided at its rear end with a cross-bar 9, to each end of which is secured the forwardly-extending tongue 10, carrying whiffletrees 11. Each tongue is braced by a strap 12, connecting the ends of the tongue and intermediately secured to the adjacent end of the cross-bar 5. Mounted upon either side of the gathering-truck and operating around sprocket-wheels 13 is a carrier 14 to catch the shocks and push them back along the fork. These carriers are outwardly inclined toward the ends of the gathering-fork. The inner sprocket-wheels 13 have gear-and-sprocket connection 15 and 16 with the supporting-shafts of the wheels 3. To the upper face of each tine of the fork 8 is secured a rearwardly and upwardly extending bar 17, for the purpose hereinafter specified.

Upon the main frame A is an endless shock-conveyer 18, passing over rollers 19 and 20 at the front and rear of the machine, respectively. The front rollers 19 are journaled near the bottom of the frame A, and the rear rollers are journaled at a considerable elevation above the frame in the upright posts 21. The conveyer is operated from the rear wheels 2 by means of the sprocket-wheels 22, sprocket-chain 23, and the gears 24. Extending downwardly and rearwardly from the top of the carrier is a chute 25 for the discharge of the shocks into the receptacle behind.

Pivotally connected with an eccentrically-working crank 26, journaled in the upper ends of the posts 27 at the front of the frame, are walking-rakes 28, having downwardly-projecting front ends 29. The rear ends of the rakes are pivotally connected with lever-arms 30, the opposite ends of said lever-arms having pivotal support 31 in the upper ends of the posts 32, carried by the frame A. The crank 26 is operated from the front roller 19 of the carrier by means of the gearing 33, sprocket-wheels 34, and sprocket-chain 35.

In order to prevent the grain being carried to the outside of the carriers 14, forwardly-extending bars 36 are secured to the posts 27, the forward ends of said bars passing inwardly around the rear sprockets 13 and their supports. In order to raise and lower the forward end of the gathering-frame, I provide a bar 37, connected at its front end by a bolt 38 with a cross-bar 4 and pivotally connected at its rear end with a vertical bar 39, extending through the frame A, the bar 37 passing intermediately under a strap 40, supported by the cross-bar 9. The upper end of the vertical bar 39 is connected with a lever 41, having fulcrum-support 42. The connection between the gathering-frame and the main frame A will yield sufficiently to allow actuating of the lever mechanism just described.

In operation when the machine is drawn forward the fork 8 will gather up the shocks, which will then be carried by the carriers 14 over the bars 17 to the conveyer 18, the operation being assisted by the eccentrically-working rakes 28. When the shocks have reached the uppermost part of the conveyer 18, they will drop into the chute 25 and from there to the wagon or other receptacle. (Not shown.)

It will be noted that all of the working parts are operated from the rear wheels 2 except the carriers 14, which are operated from the wheels 3.

Having now described my invention, what I claim as new, and desire to secure by Letters Patent, is—

1. In a shock-loader of the class described, the combination with a frame supported upon wheels at its rear end, of a wheeled truck pivotally supporting the forward end of said frame, a gathering-fork carried by said truck, diverging carriers arranged upon said fork, a rearwardly-extending conveyer carried by said frame, guide-bars secured to said frame alongside said conveyer and extending forwardly past the inner ends of said carriers, and means for actuating said carriers and conveyer.

2. In a shock-loader of the class described, the combination with a frame supported upon wheels at its rear end, of a truck pivotally supporting the forward end of said frame, a forwardly-extending fork carried by said truck, carriers arranged upon said fork, a rearwardly and upwardly extending conveyer arranged upon said frame, bars connected with said fork and extending upwardly toward said conveyer, and a driving connection between said conveyer and said carriers and said wheels.

3. In a shock-loader of the class described, the combination with a frame supported upon wheels at its rear end, of a wheeled truck pivotally supporting the forward end of said frame, a forwardly-extending fork carried by said truck, a cross-bar carried by said truck, forwardly-extending tongues secured to the end of said cross-bar, carriers supported upon said fork, a rearwardly and upwardly extending conveyer supported upon said frame, walking-rakes arranged in connection with said conveyer, and a driving connection between said conveyer, rakes, carriers and said wheels.

4. In a shock-loader of the class described, the combination with a frame supported upon wheels at its rear end, of a wheeled truck pivotally supporting the forward end of said frame, a forwardly-extending fork carried by said truck, lever mechanism for raising and lowering the forward end of said fork, outwardly-extending carriers arranged upon said fork, a rearwardly and upwardly extending conveyer arranged upon said frame, walking-rakes arranged in connection with said conveyer, and a driving connection between said conveyer, rakes, carriers and said wheels.

In testimony whereof I affix my signature in presence of two witnesses.

DAVID J. GREEN.

Witnesses:
EDWIN BRIMSON,
LOUIS GOETTSCH.